Aug. 26, 1941.  W. OWEN  2,254,086
PROCESS AND APPARATUS FOR THE MANUFACTURE OF HOLLOW BUILDING UNITS
Filed Nov. 13, 1937  4 Sheets-Sheet 4

INVENTOR.
WILLIAM OWEN
BY Bradley & Bee
ATTORNEYS.

Patented Aug. 26, 1941

2,254,086

UNITED STATES PATENT OFFICE 2,254,086

PROCESS AND APPARATUS FOR THE MANUFACTURE OF HOLLOW BUILDING UNITS

William Owen, Pittsburgh, Pa., assignor to Pittsburgh Plate Glass Company, Allegheny County, Pa., a corporation of Pennsylvania Application November 13, 1937, Serial No. 174,374

6 Claims. (Cl. 49—1)

The present invention relates to hollow construction units and more particularly to a process of and apparatus for manufacturing transparent building units from glass and other vitreous materials.

One object of this invention is the provision of an improved process of and apparatus for the fabrication of hollow building units by means of which a more perfect article is obtained at a reduced cost.

A second object of my invention is to provide a process of manufacturing composite building units in which the assembled elements are securely welded together by positive pressure exerted thereon and the pressed units are annealed for greater strength in a continuous operation.

Other objects and advantages of my invention will become more readily apparent during the course of the following detailed description.

Briefly stated, my invention comprises the assembling of the component elements of a transparent building unit which are then subjected to a gradually increasing temperature by means of which the units are brought to a condition at which the separate elements may be welded together under a positive pressure, pressing the units, and then subjecting the pressed units to a controlled cooling in order that they may be properly annealed.

With the advent of glass brick into the construction field, it has become desirable to perfect apparatus enabling a more efficient production of units of this type. The many advantages of glass building blocks, which are well known and need not be enumerated here, have occasioned a widespread demand for such units, and in order to encourage their use the cost of production should be reduced. Manifestly, therefore, glass bricks can no longer be produced by a unit process and it is the purpose of this invention to provide a process and apparatus which will lend themselves to mass production.

My invention contemplates the provision of a continuous process in which the assembled units are heated, pressed and cooled with a minimum of labor and handling. The finished product requires no additional treatment and is readily accepted by the industry as the equivalent of those blocks manufactured in other ways.

Figure 1:
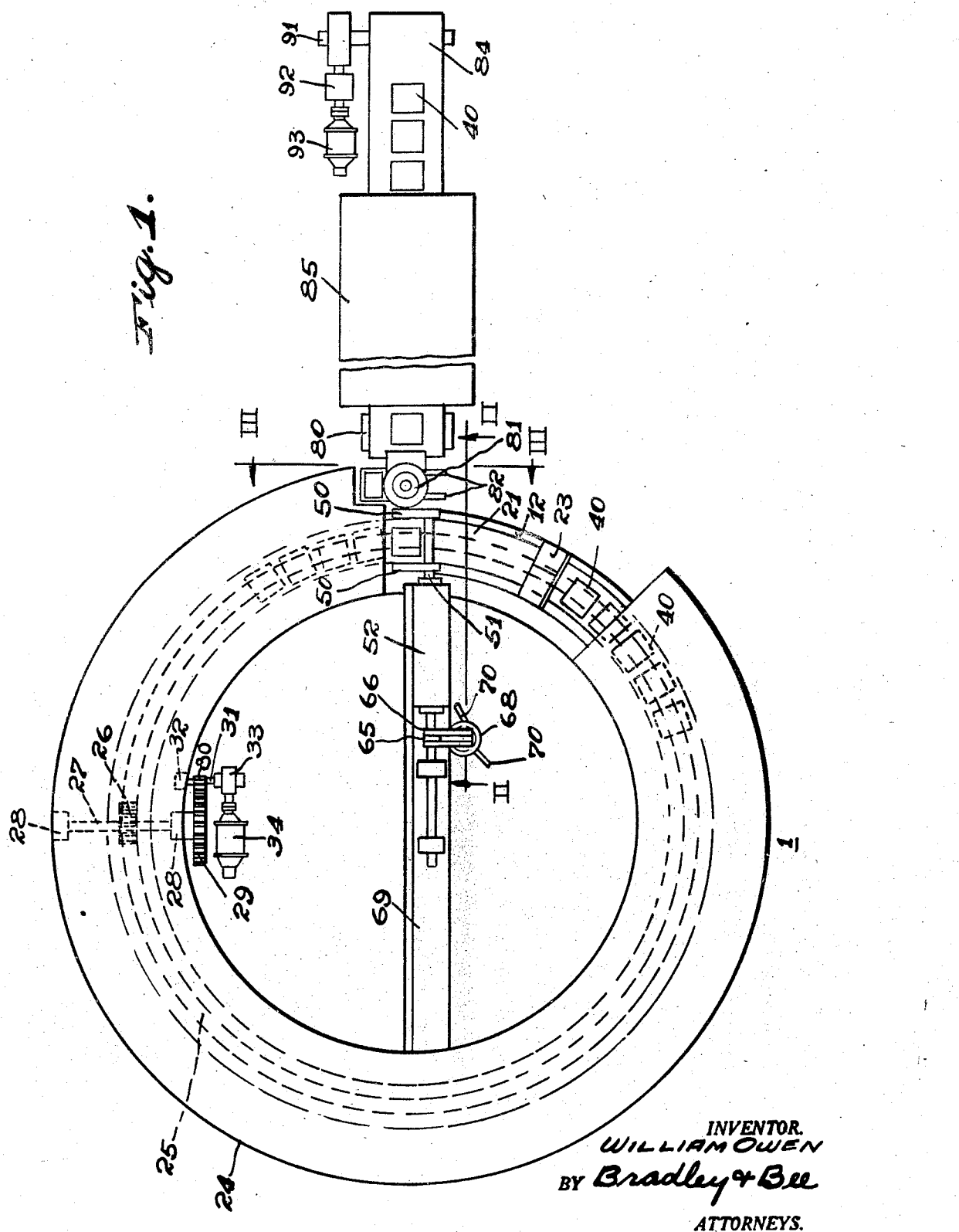
Figure 2:
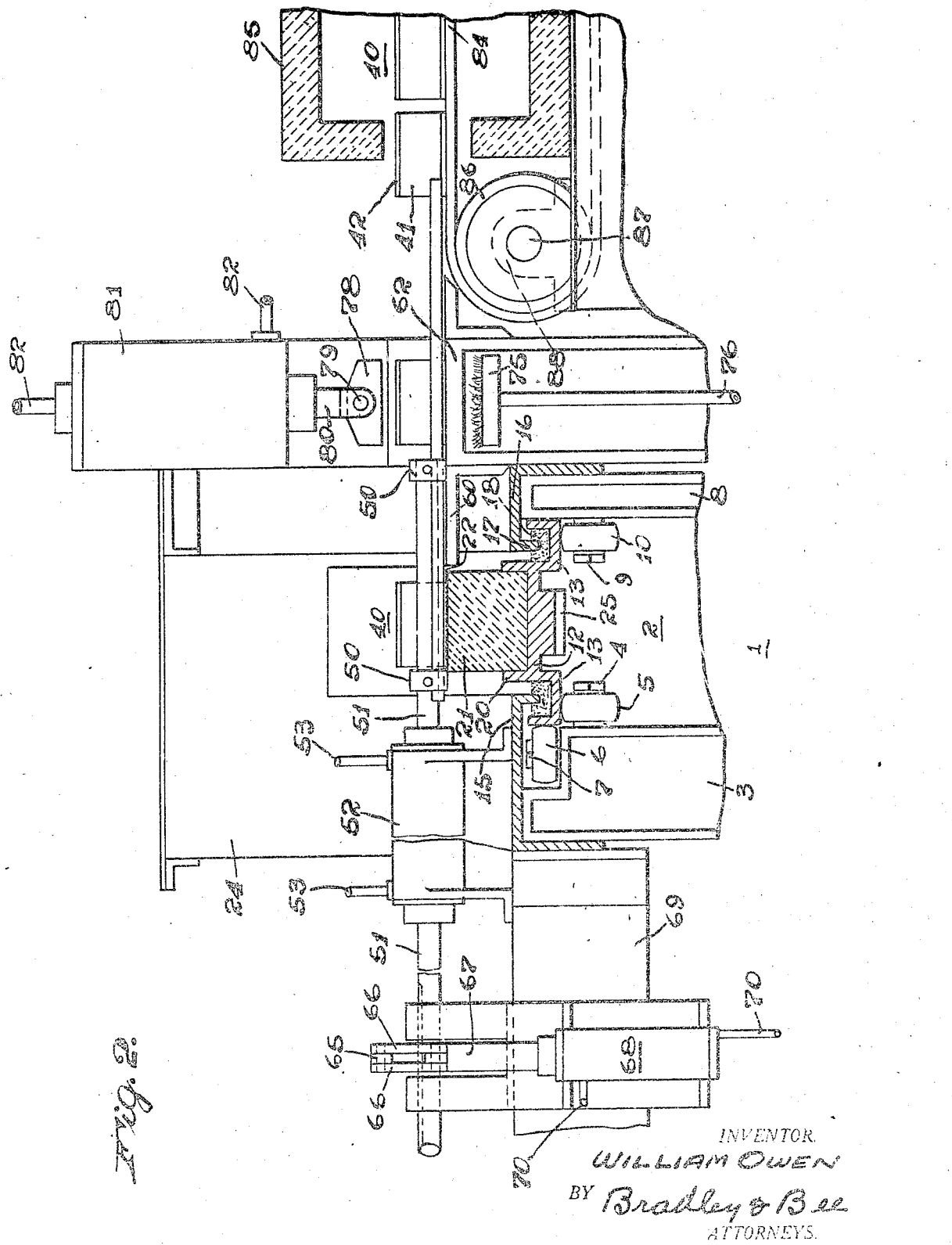
Figure 3:
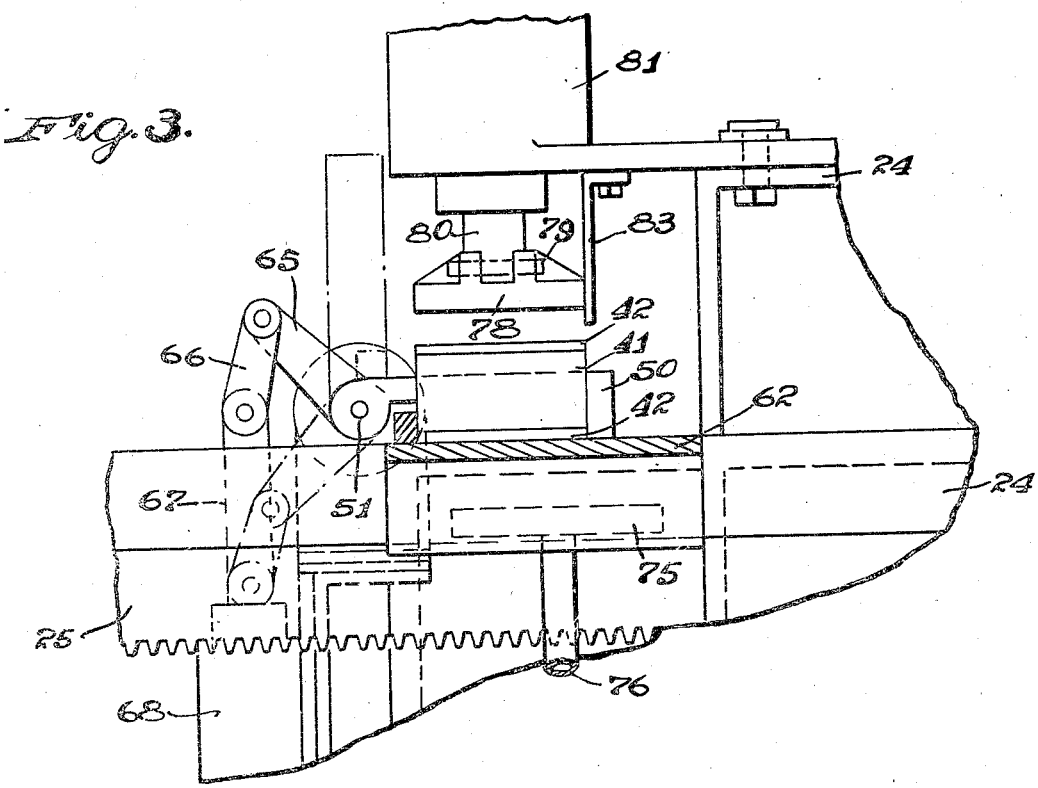
Figure 4:
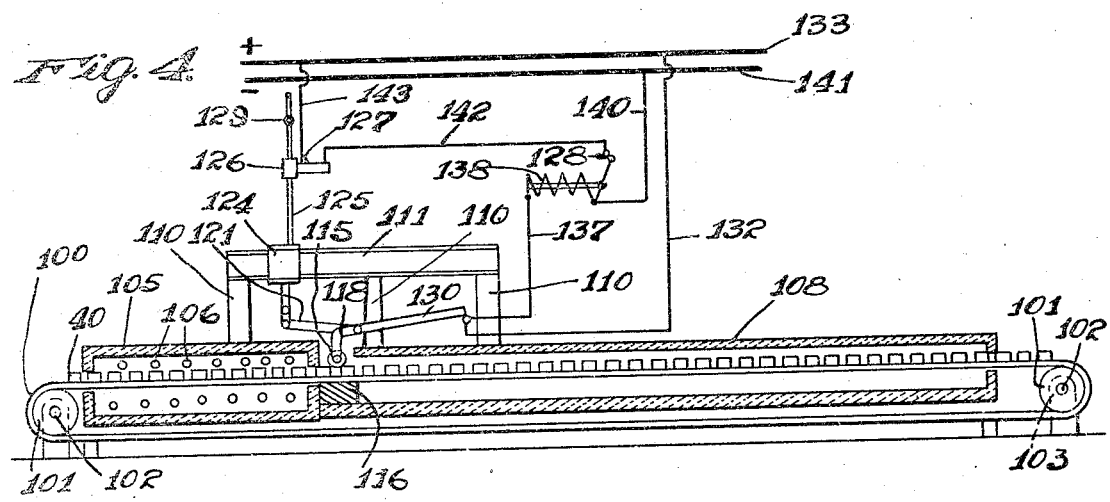
Figure 5:
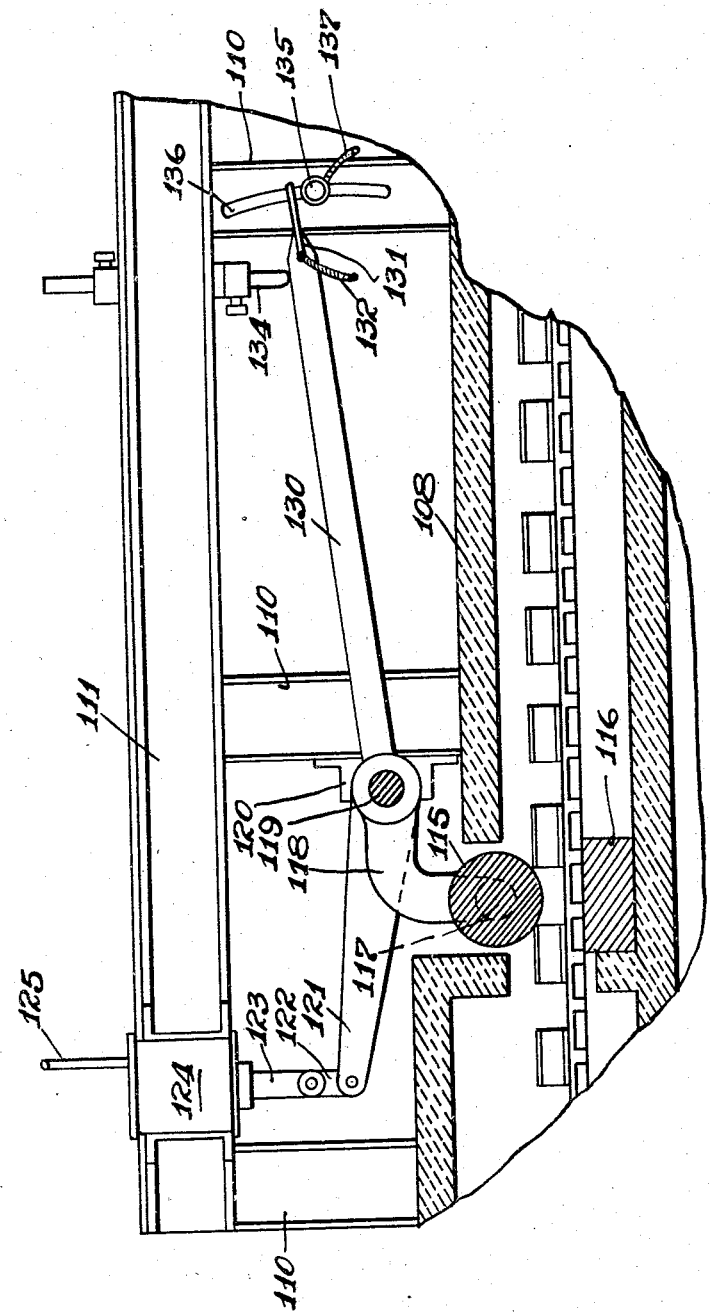

The preferred embodiments of apparatus constructed in accordance with my invention are illustrated in the accompanying drawings, wherein: Figure 1 is a plan view of the entire apparatus; Figure 2 is a side elevational view taken substantially along the line II—II of Figure 1; Figure 3 is a partial sectional view taken substantially along the line III—III of Figure 1; Figure 4 is a side view, partially in elevation and partially in section, of a modification of the apparatus; and Figure 5 is an enlarged detail view of the pressing apparatus and controls therefor utilized in the modification of Figure 4.

In the drawings, a circular preheating oven 1, constructed of metal, fire-brick, or other suitable material and heated in any desired manner, rests upon a base 2 comprising an inner set of hollow vertical members 3 arranged in spaced relation around a circle and from which project horizontal shafts 4 having wheels 5 journaled thereupon. Wheels 6 are carried upon vertical shafts 7 secured in offsets provided in the upper surface of the vertical members 3. A second set of hollow supports 8 are disposed concentrically with respect to the first set of members 3 and likewise are provided with horizontal shafts 9 carrying wheels 10 identical to those already described. An annular rotary hearth 12 is provided with inner and outer trough-like, peripheral flanges 13 which rest upon the wheels 5 and 10 and are confined from lateral displacement by the wheels 6. The spaces about the edges of the hearth 12 are sealed by inner and outer annular plates 15 and 16 which are secured to the tops of the vertical members 3 and 8 and from which flanges 17 project downwardly into the peripheral flanges 13. Sand 18 or similar material disposed in the flanges 13 constitute the sealing medium. The hearth 12 is also provided with upwardly extending spaced flanges 20 which secure blocks 21 of refractory material. The top surface of these blocks 21 may be covered with a thin layer 22 of sand or other material from a reservoir 23, mounted thereover, to provide a non-adhesive surface for the partially fabricated units carried thereupon. An annular hood 24 which encloses all except a small section of the hearth 12 is secured to the plates 15 and 16 and completes the oven assembly.

The hearth 12 carries a circular rack 25 upon its lower face, which rack engages a pinion gear 26, secured to a shaft 27, mounted transversely of the base 2 in bearings 28. The shaft 27 carries at one end thereof a gear 29 which engages a pinion gear 30, keyed to a shaft 31, supported in bearings 32 and driven through a suitable reducing gear 33 by a motor 34. In this manner, a constant rotation of the hearth 12 through the oven 1 is effected.

The hollow building units 40 which are to be fabricated in this apparatus consist of three separate elements, a central core section 41 of tile or other vitreous material and two covering plates 42 of transparent or translucent glass. The central core sections 41 are covered with a low melting point glaze which serves as a cement to bond the separate elements together. The units 40 are assembled and placed upon the hearth 12 at the opening provided in the hood 24 and are carried through the preheating oven 1, wherein the glaze coating of the core section softens. Upon emerging from the preheating oven 1, the heated units 40 are removed from the hearth 12 by the inner of two feeder arms 50 attached in spaced relation to a piston rod 51 which projects from a cylinder 52 mounted horizontally upon the plate 15 between the extremities of the hood 24. Air under compression to actuate the piston 51 is admitted to the cylinder 52 through conduits 53. A bridge 60 secured to the annular plate 16 provides a support for the units 40 while they are being advanced by the feeder arm 50 and abuts a platen 62 upon which the units are pressed to secure adhesion of the plates 42 to the core section 41.

The horizontal piston rod 51 may be rotated through an angle of 90 degrees in order that the feeder arm 50 may be moved into engagement with or disengagement from the hearth 12, the bridge 60 or the platen 62, by means of a crank 65 slidably keyed upon the shaft 51 to the rear of the cylinder 52. The crank 65 is connected by means of links 66 to a piston 67 that reciprocates in a vertical cylinder 68, mounted upon a beam 69 extending rearwardly from the adjacent support 3. Fluid under compression for actuating the piston 67 is admitted to the cylinder 68 through conduits 70.

The platen 62 is heated by means of a gas burner 75 positioned thereunder to which premixed gas and air is fed through a conduit 76. A plunger 78 coacting with the platen 62 is swivelly connected at 79 to a piston 80 reciprocating in a cylinder 81, mounted vertically over the platen 62 upon an extension of the hood 24. Compressed air for actuating the piston 80 is admitted to the cylinder 81 through conduits 82. A suitable guide member 83 to direct the plunger 78 is supported upon the cylinder 81 and projects toward the platen 62.

After the units 40 have been pressed to effect a seal, they are advanced by means of the outer feeder arm 50 to an endless conveyor 84 by means of which the pressed units 40 are carried through an annealing leer 85 of standard construction. The endless conveyor 84 passes over a roller 86 secured to a shaft 87, supported in bearings 88 and is driven by a roller (not shown) attached to a shaft 91, which shaft is driven through a suitable speed reducing mechanism 92 by a motor 93.

The modification of the preferred embodiment of my invention as illustrated in Figures 4 and 5 utilizes a pressure roller in place of the plunger 78 to effect a weld of the units 40. The apparatus comprises an endless conveyor 100 passing over rolls 101, keyed to shafts 102, mounted in bearings 103 and driven by any suitable means. The conveyor 100 is designed to carry the assembled building units 40 through a preheating oven 105, of refractory material or the like, in which are disposed heating elements 106, constituting gas flames or electrical resistance units. The conveyor 100 subsequently passes through an annealing leer 108, suitable supports therefor (not shown) being disposed throughout both the oven 105 and the leer 108 to prevent collapse of the conveyor belt.

Vertical members 110 at the sides of the annealing leer 108 and the oven 105 are interconnected by horizontal members 111 to form a substantial superstructure. A pressing roller 115, extending transversely of the conveyor 100 immediately above a platen 116 secured beneath the conveyor 100 adjacent the oven 105, is journaled in bearings 117 in the extremities of arms 118 which arms are keyed to a shaft 119 supported in bearing blocks 120 attached to the central opposed pair of vertical members 110. An arm 121 is secured to the shaft 119, extending forwardly therefrom, and is connected by links 122 to a piston 123 reciprocating in a vertical cylinder 124 secured to the horizontal member 111 of the superstructure. Compressed air enters the cylinder 124 through a conduit 125 to actuate the piston 123, the flow of air being regulated by a valve 126, operated by a solenoid 127 controlled from the relay switch 128. An ordinary gate valve 129 is provided in the compressed air conduit 125 to control the air pressure should the valve 126 fail to function.

An arm 130 is also secured to the shaft 119, projecting rearwardly therefrom, and carries a spring contact 131, connected by a cable 132 to a conductor 133 of electric current.

The upward movement of this arm 130 is limited by an adjustable stop 134 secured to the horizontal member 111 of the superstructure. A second contact 135 is adjustably secured in an arcuate slot 136, provided in the vertical member 110 supporting the back section of the horizontal member 111, and is connected by a cable 137 to a solenoid 138 of the relay switch 128. The switch 128 and the solenoid 138 are connected by a cable 140 to the conductor 141 of electric current. A cable 142 connects the switch 128 and the solenoid 127, while a cable 143 connects the solenoid 127 with the conductor 133 of electric current.

In the operation of the preferred embodiment of my invention as illustrated in Figures 1–3, the motor 34 is started to drive the hearth 12 in the preheating furnace 1 and the reservoir 23 is opened to feed the layer of sand 22 to the upper surface of the blocks 21 of the hearth. When the temperature of the preheating oven 1 reaches the desired point the assembled units 40 are placed upon the hearth at suitable intervals. The units 40 pass through the preheating oven and the low melting point flux coating the core sections 41 thereof is softened and joins the covering glass plates 42 to the core sections 41. As the first unit 40 emerges from the preheating oven 1, compressed air is passed into the cylinder 52 to advance the piston rod 51 and the feeder arm 50, thus moving the heated unit 40 from the hearth 12 over the bridge 60 to the platen 62. With the arm 51 in this advanced position, it is turned through an angle of 90 degrees by the operation of the piston 67 in the cylinder 68 actuating the crank 65. The flow of air into the cylinder 52 is reversed to retract the rod 51 from its advanced position to that point at which the feeder arm 50 clears the hearth 12. The piston 67 is then advanced, lowering the feeder arm 50 to its horizontal position. Air is then passed into the cylinder 81 to force the piston 80 and the plunger 78 downwardly against the unit 40, contained on the platen 62, to weld the separate elements thereof together. After such pressing operation is completed, the piston 80 is again raised by reversing the flow of air into the cylinder 81. By this time, a second unit 40 has emerged from the preheating oven 1 and air is again admitted into the cylinder 52 to drive the rod 51 forward. The inner arm 50 removes the second unit 40 from the hearth 21 and passes it over the bridge 60 to the platen 62 from which the first element 40, already pressed, has been removed by the outer feed arm 50, to the conveyor 84. The rod 51 is again rotated through 90 degrees in order that the outer arm 50 will clear the block 40 on the platen and the inner arm 50 will clear the succeeding block emerging from the preheating oven 1 as the rod 51 is drawn back to its original position. The pressed units 40 are passed continuously through the annealing leer 85 and after such treatment may be inspected and packed as they leave the leer 85.

The fabrication of the building units 40 as contemplated with the apparatus illustrated in Figures 4 and 5 is more readily accomplished, due to the simplified apparatus employed. The preheating oven 105 is brought up to temperature and the conveyor 100 started. The assembled blocks 40 are placed upon the conveyor 100 at the entrance to the preheating oven 105 and are carried therethrough while the separate elements of the blocks are softened and cemented together. On leaving the preheating oven 105, the first brick 40 engages the pressing roller 115, causing it to be moved vertically. Such vertical movement causes the arm 130 to be lowered until the contact 131 engages the contact 135, closing the electrical circuit which operates the relay switch 138 to open the air valve 126. The entrance of air through the conduit 125 into the cylinder 124 moves the piston 123 downwardly and with this movement, arm 121 is forced down, thus rotating the shaft 119 and exerting a pressure through the arms 118 and the roller 115 upon the block 40 passing therebeneath. The platen 116, lying directly beneath the pressing roller 115, permits an equal distribution of the pressure between the upper and lower surfaces of the glass block. When the arm 121 is forced down by the piston 123, it causes the arm 130 to be raised sufficiently to break the electric circuit, operating the relay switch 139 and the valve 126. Pressure is, however, maintained in the cylinder 124 until the block 40 is completely pressed. The pressed units pass through the annealing leer 108 and as they emerge therefrom they are inspected and packed.

It will be seen therefore that from the time the assembled units are placed in the apparatus until they are removed mechanically in a continuous process, the finished product will be entirely uniform throughout and there is little chance of breakage because each unit is subjected to equal treatment. While the apparatus has been described as operating solely upon a construction unit comprising three elements, that is the core section and covering glass plates, it may be used with splendid results to fabricate bricks composed of two rectangular cup sections formed entirely of glass. It will also be obvious that various changes and modifications may be made in the apparatus without departing from the spirit or scope of my invention as defined in the appended claims.

What I claim is:

1. The process of manufacturing hollow building units which comprises placing the component elements of the units in superposed relation, passing the assembled units through a preheating oven, applying a direct vertical pressure to the heated units as they are removed from the preheating oven to weld the separate elements of each unit together, and cooling the pressed units gradually to effect a proper annealing thereof.

2. The process of manufacturing hollow vitreous building units which comprises placing the component elements of the units in superposed relation, passing the assembled units through a preheating oven, applying a rolling pressure to the upper surface of the heated units as they pass from the preheating oven to weld the separate elements of each unit together, and cooling the pressed units gradually to effect a proper annealing thereof.

3. The process of manufacturing hollow building units which comprises assembling hollow vitreous tiles coated with a low melting glaze and two covering glass plates, passing the assembled units through a zone of increasing temperatures to soften the glaze, pressing the heated units to weld the separate elements of each unit together, and passing the pressed units through a zone of decreasing temperatures to effect a proper annealing thereof.

4. The process of manufacturing hollow building units which comprises assembling hollow vitreous tiles coated with a low melting glaze and two covering glass plates, passing the assembled units through a preheating oven to soften the glaze, applying a direct vertical pressure to the heated units as they are removed from the preheating oven to weld the separate elements of each unit together, and cooling the pressed units gradually to effect a proper annealing thereof.

5. The process of manufacturing hollow building units which comprises assembling hollow clay tiles coated with a low melting glaze and two covering glass plates, passing the assembled units through a preheating oven to soften the glaze, applying a rolling pressure to the upper surface of the heated units as they leave the preheating oven to weld the separate elements of each unit together, and cooling the pressed units gradually to effect a proper annealing thereof.

6. Apparatus for the manufacture of hollow vitreous building blocks comprising a preheating kiln having an entrance end and an exit end, an endless conveyor passing through the kiln and projecting from opposite ends thereof, said conveyor being adapted to receive the component parts of the blocks in assembled relation, a press disposed adjacent to the exit end of the kiln, means for advancing preheated blocks in assembled relation from the conveyor into the press and including means for moving blocks from the press after the pressing operation, a second conveyor disposed to receive the blocks as they are moved from the press and an annealing leer enclosing at least a portion of the second conveyor.

WILLIAM OWEN.